May 18, 1943. H. W. CARNES 2,319,659
COMBINED PRESSURE REGULATING AND RELIEF VALVE ASSEMBLY
Filed Aug. 24, 1940 2 Sheets-Sheet 1

INVENTOR
HERMAN W. CARNES
BY
ATTORNEY

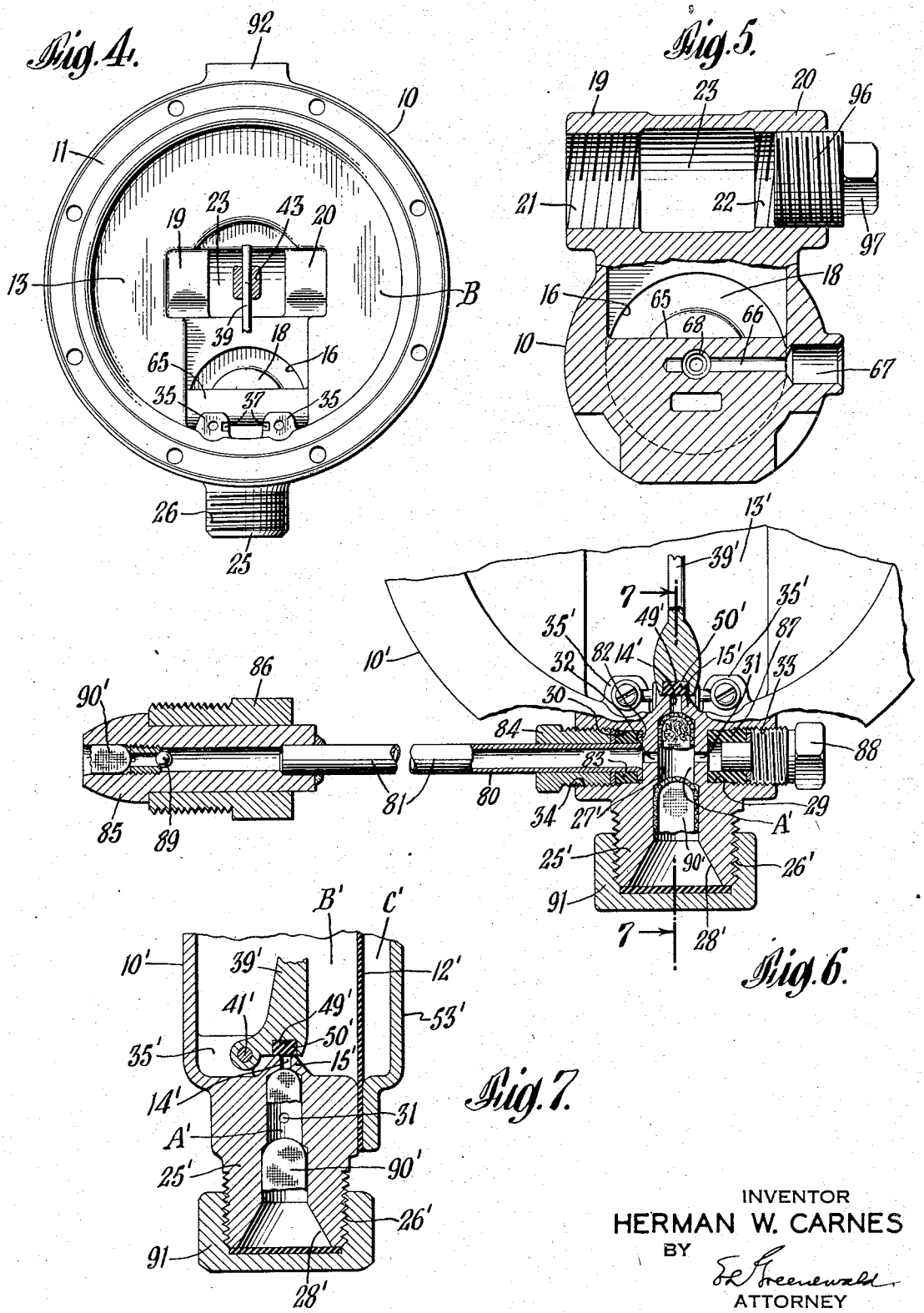

Patented May 18, 1943

2,319,659

UNITED STATES PATENT OFFICE 2,319,659

COMBINED PRESSURE REGULATING AND RELIEF VALVE ASSEMBLY

Herman W. Carnes, Indianapolis, Ind., assignor to Carbide and Carbon Chemicals Corporation, a corporation of New York Application August 24, 1940, Serial No. 354,019

4 Claims. (Cl. 50—26)

This invention relates to pressure regulating apparatus, and more particularly to a combination pressure regulating and relief valve assembly.

In controlling the flow of fluid from high pressure storage devices, such as cylinders or tanks to a distribution system, it is common practice to employ a pressure regulating valve for maintaining the pressure of the fluid in the distribution system at a desired substantially constant value, and a pressure relief valve for venting fluid from the distribution system in the event that the pressure in the latter exceeds a predetermined desired safe value. Such apparatus is particularly necessary in isolated gas supply systems of the type in which gas for domestic appliances is supplied from cylinders or containers in which the gas is stored either in a liquid or gaseous state under relatively high pressure. In such systems, the pressure of the gas must be reduced to a relatively low value which is safe and practical for domestic purposes. Additionally, protective means must be provided in order to prevent excessive pressure in the distribution system endangering the safety of the user of the gas.

In isolated gas supply systems of the type described above, it is customary to mount one or more cylinders of gas, together with the necessary regulating equipment, in a suitable cabinet. The regulating equipment usually includes manually or automatically operable valves for switching the gas supply from an empty cylinder to a full cylinder when one cylinder has become exhausted, suitable gauges for indicating the pressure of the gas in the container and in the distribution system, a pressure regulating valve for maintaining the pressure of the gas in the distribution system at or below a predetermined value, and a pressure relief valve for venting gas from the distribution system when the pressure of the gas therein exceeds a desired safe value. In order to maintain the size of the installation within desired limits, the arrangement of the equipment must be made as compact as possible. Heretofore, the pressure regulating valve and the relief valve generally have been separate units, requiring a considerable amount of space for mounting and increasing the cost of installation.

It is an object of this invention to provide a combined pressure regulating and relief valve assembly; to provide pressure regulating apparatus including a pressure regulating valve and a relief valve which are mounted in a single unitary device and are independently adjustable, and to provide a combined pressure regulating and relief valve assembly which is simple and compact in construction and efficient in operation, and readily adaptable to mounting in inaccessible places and to easy connection with sources of fluid.

These and other objects of the invention will in part be obvious and in part become apparent from the following description and the accompanying drawings, in which:

Fig. 4 is a view of a casting forming part of the valve assembly, showing a portion of the pressure regulating valve;

Fig. 5 is a section on the line 5—5 of Fig. 3, looking in the direction of the arrows;

Fig. 6 is an end view, partly in section, of a modified form of valve assembly embodying the principles of the invention; and Fig. 7 is a section on the line 7—7 of Fig. 6, looking in the direction of the arrows.

Generally speaking, the pressure regulating apparatus of the invention comprises a pressure regulating valve and a relief valve, both of which are mounted in a single valve assembly, and which are adjustable independently of each other. The pressure regulating valve employs a pressure responsive means in the form of a flexible diaphragm clamped between two casing sections providing a diaphragm or spring chamber and a delivery pressure or outlet chamber. An adjustable spring acts against one side of the diaphragm which is moved against the spring by the pressure of gas in the outlet chamber. A lever is pivotally secured in the outlet chamber for transmitting movement of the diaphragm to a valve that controls the flow of gas from an inlet passage into the outlet chamber, the arrangement being such that a slight fall of outlet pressure causes the diaphragm to move the valve by means of the lever so that the valve port is opened wider allowing more gas to flow from the inlet passage into the outlet chamber to maintain the desired delivery pressure.

The relief valve employs a pressure responsive means in the form of a flexible diaphragm clamped between a casing section and a spring housing and providing a diaphragm or spring chamber separated from the delivery pressure or outlet chamber by the diaphragm. An adjustable spring in the spring housing acts against one side of the diaphragm which may be pushed against the spring by the pressure of gas in the outlet chamber. Normally, the diaphragm is seated against and seals a fluid outlet opening formed in the casing section, the arrangement being such that an increase of the outlet pressure above a predetermined or desired safe value causes the diaphragm to move away from the valve seat to open the outlet chamber and vent the fluid in the chamber to the atmosphere or to a suitable discharge conduit, until such time as the pressure has dropped below the value for which the relief valve spring has been set.

Figure 1:
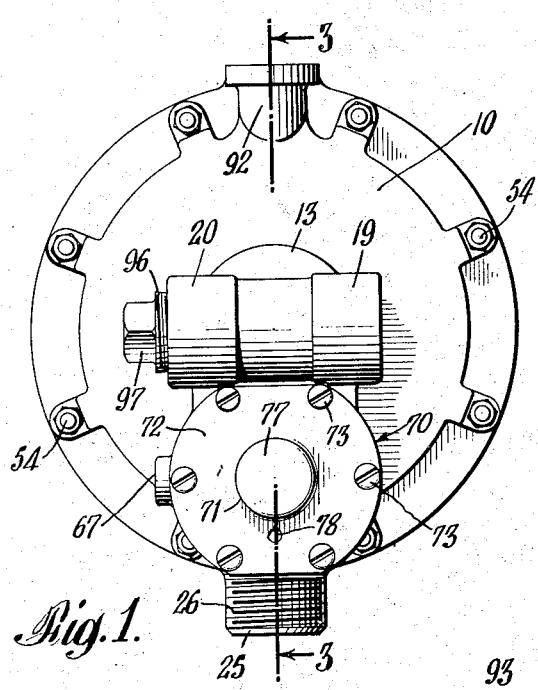
Fig. 1 is a left end view of a valve assembly embodying the principles of the invention.
Figure 2:
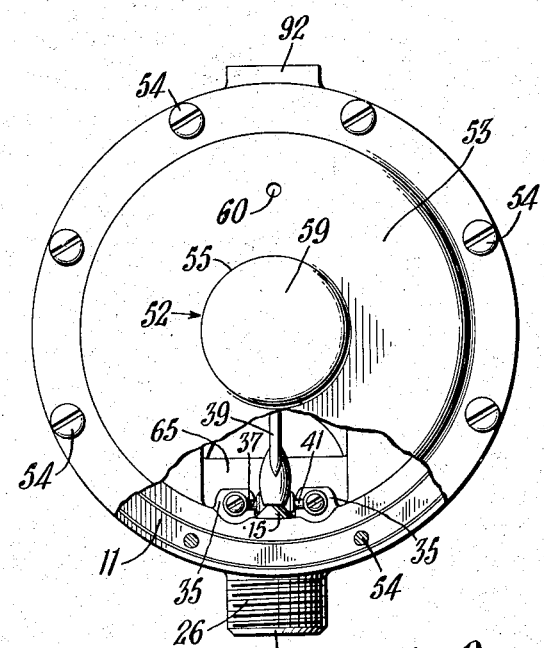
Fig. 2 is a right end view of the valve assembly shown in Fig. 1.
Figure 3:
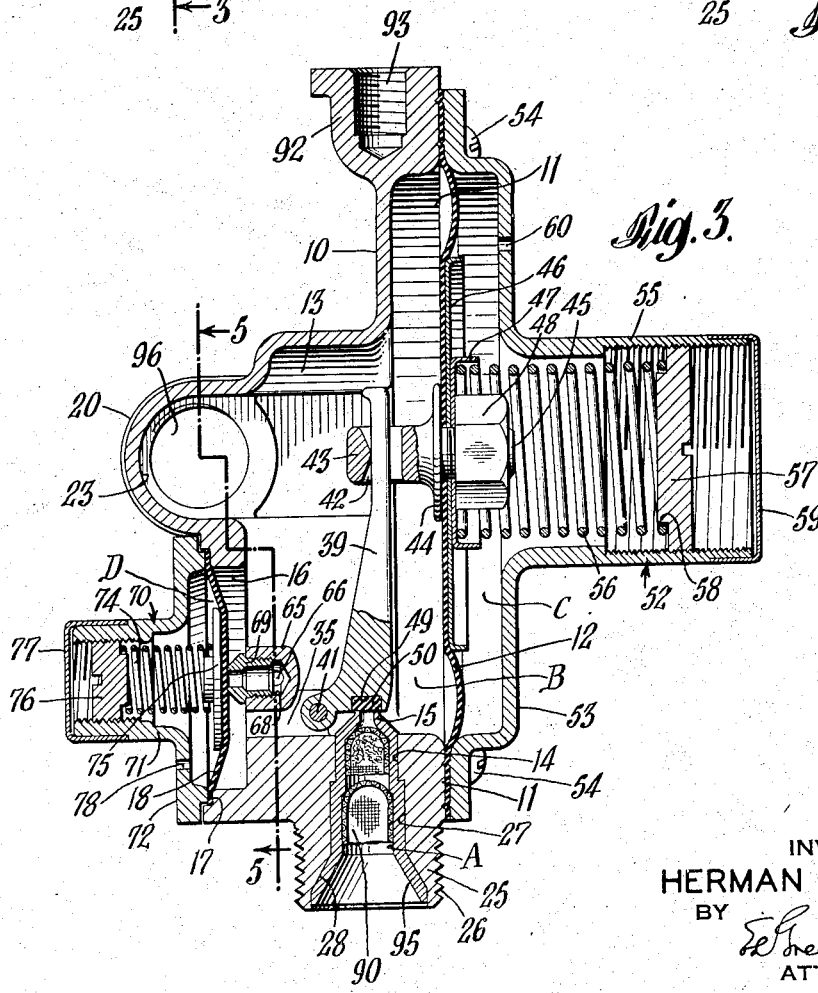
Fig. 3 is a section on the line 3—3 of Fig. 1, looking in the direction of the arrows.

Referring now to the drawings, the valve assembly shown in Figs. 1-5 includes an inlet chamber A, an outlet chamber B, a regulator valve spring chamber C and a relief valve spring chamber D. The outlet chamber B is formed in a substantially circular integral member such as a casting 10 having an opening bounded by an annular rim or wall 11, the opening being sealed by a regulator valve diaphragm 12 having its marginal portion secured against the rim 11. The wall of the casting 10 opposite such opening has a trough-like depression 13 which extends diametrically from the annular rim or wall 11 of the casting to the center thereof. An inlet opening 14 is formed in the outer end wall of the depression, and adjacent the inlet opening the casting 10 is formed with an opening 16 having a shoulder 17. The opening 16 is formed partly in the depression 13 and partly in the annular wall of the casting 10, as by milling or counterboring. A relief valve diaphragm 18 seals the opening 16. Adjacent its inner end, depression 13 is formed with a transversely extending recess 23 terminating at each end in aligned bosses 19 and 20 which are drilled and threaded to form outlet openings or passages 21 and 22, respectively, communicating with said recess.

The inlet chamber A is formed in an integral radial extension 25 of casting 10 adjacent the opening 16, and the outer end of the extension is threaded, as at 26, for connection to a source of fluid under pressure. Chamber A includes a passage 27 extending centrally through extension 25, aligned with opening 14, and enlarged at its outer end to form a conical recess 28. Seated in the opening 14 and the passage 27, is a nozzle insert 95 enlarged at one end to fit recess 28 and reduced at the other end to form a valve seat 15 projecting into chamber B. Filter material 90 may be disposed within the insert 95.

Flow of fluid from the inlet chamber A to the outlet chamber B through the nozzle insert 95 is controlled by the pressure regulating valve. Adjacent the opening 14, the side walls of depression 13 are formed with a pair of directly opposite blocks or lugs 35, each block having an open slot-like recess 37 in its upper surface. A pivot for a valve lever 39 is formed by securing the ends of a transverse shaft 41 in the recesses 37, and the hub of lever 39 is journalled on the shaft 41 between the blocks 35. The lever 39 extends longitudinally of depression 13 substantially to the center of diaphragm 12, where the end of the lever is seated in a slot 42 in a connecting link 43. Link 43 is formed with an enlarged bearing face 44 engaging one side of diaphragm 12 and a threaded extension 45 extending through the diaphragm. Engaging the other side of the diaphragm is a backing plate 46, and engaging the plate 46 is a spring seat 47. The central portion of diaphragm 12 is clamped between the bearing face 44 and plate 46 by means of a nut 48 threaded on extension 45 and engaging spring seat 47.

The pivot end of lever 39 is formed with a recess 49 in which is held a valve member 50 of rubber or other flexible material. Movements of diaphragm 12 in response to pressure variations in chamber B are communicated to lever 39 through link 43. The valve member 50 engages the valve seat 15 to control the flow of fluid from chamber A to chamber B through the nozzle or opening 14 in response to movement of diaphragm 12 and lever 39.

Diaphragm 12 is secured in gas-tight relation to casting 10 by a spring casing 52 having a flat circular rim portion 53, secured to casting 10 by suitable means such as machine screws 54. The casing 52 is formed with a central spring housing 55, the outer end of which is internally threaded. A regulator valve spring 56 is disposed in housing 55, and one end of the spring engages spring seat 47. The opposite end of the spring is engaged by an adjusting nut 57, threaded into the housing 55 and formed with an annular, spring-centering shoulder 58. The outer end of the housing 55 may be closed by a cap 59. A small hole 60 in the housing 55 provides atmospheric pressure within the housing.

Venting of fluid from the chamber B when the pressure exceeds a predetermined value is controlled by the pressure relief valve including the diaphragm 18. For this purpose, the opening 16 in the depression 13 is bridged by an integral member, such as a strut 65. The strut 65 is drilled longitudinally to form an outlet passage 66 enlarged at its outer end 67. A transversely drilled passage 68 intersects passage 66 adjacent its inner end, and passage 68 is threaded to receive a removable valve seat member 69 operatively associated with diaphragm 18.

A relief valve spring casing 70, formed with a threaded spring housing 71, has a flat rim portion 72 secured to the shoulder 17 by suitable means, such as machine screws 73. The periphery of diaphragm 18 is secured in gas-tight relation between the shoulder 17 and the rim portion 72 of casing 70. Diaphragm 18 normally is held in sealing engagement with member 69 by a spring 74 in housing 71. One end of spring 74 engages a spring seat 75 on one side of diaphragm 18, and the opposite end of the spring engages an adjusting nut 76 threaded into housing 71. The outer end of the housing may be sealed by a cap member 77. A small hole 78 in housing 71 provides atmospheric pressure within the housing. The casting 10 is formed with an easily accessible mounting arrangement in the form of a protuberance 92 having a threaded opening 93 to receive mounting or supporting means, such as a bolt.

In operation, the inlet chamber A may be secured to a suitable source of fluid under pressure. If desired, the valve assembly may be secured to the outlet of a change-over valve of the type described and claimed in Patent No. 2,197,144, issued on April 16, 1940, in the name of Herman W. Carnes. The outlet connection for the valve assembly may be secured in either or both of the outlet openings 21 or 22, as is most convenient or desirable. If one of the outlet openings is not used, it may be sealed by a suitable plug 96 having a squared head 97 to receive a wrench or similar device. Fluid vented from the chamber B through the relief valve may be discharged directly from the outer end 67 of passage 66 or a suitable connection can be secured therein to discharge the vented fluid at any desired point.

In operation of the valve assembly, full pressure of the fluid from the source of supply exists in inlet chamber A. The regulator valve spring 56 is set for the desired operating pressure by means of nut 57 and will urge diaphragm 12 and the inner end of lever 39 inwardly. The valve member 50 will be urged away from valve seat 15 until such time as the pressure of the fluid in chamber B equals or exceeds that for which spring 56 has been set. When this condition occurs, valve member 50 will engage valve seat 15 to interrupt flow of fluid through inlet or nozzle 14 from inlet chamber A to outlet chamber B until such time as the pressure in chamber B has dropped below the preselected value. By substituting springs of different effective strengths for the spring 56, a large range of operating pressures may be provided.

Normally the relief valve is designed to open at a higher pressure than that maintained in chamber B by the regulator valve. The pressure at which the relief valve opens may be set by adjustment of spring 74 through nut 76. The cap member 77 is provided so that this setting may not be changed by an unauthorized person. If the pressure in chamber B exceeds that for which the relief valve is set, diaphragm 18 moves away from valve seat member 69. Fluid is then vented through the outlet passage 66 until the pressure in chamber B drops below that for which the relief valve has been set.

When the valve assembly is used in an isolated gas supply system, spring 56 usually is so adjusted as to maintain the pressure in outlet chamber B at about 10 inches of water column. This pressure will fluctuate slightly due to opening and closing of the regulator valve in admitting fluid to the outlet chamber B. However, these minor fluctuations in pressure will not affect the relief valve, which preferably is set for about one pound per square inch. If the pressure in chamber B exceeds one pound, diaphragm 18 will move away from valve seat member 69 to vent fluid until the pressure in chamber B has dropped below one pound.

It will be observed that the valve assembly is compact, readily mounted in any desired location and readily adaptable for use with varied distribution system arrangements. The caps 59 and 77 prevent dirt from entering the mechanism. The slot 42 in link 43 permits some play of the valve lever 39 to assure effective seating of the valve member 50 on the valve seat 15.

Figs. 6 and 7 illustrate a modified form of the valve assembly. In these figures, like reference characters primed have been used to designate like or corresponding parts. The modified form of inlet chamber A' is formed in an integral extension 25' of the casting 10', and the outer end of this extension is reduced and threaded as at 26'. An inlet nozzle or opening 14', surrounded by a raised valve seat 15', is formed in one end wall of the depression 13'. The outlet openings and the relief valve, in this modified valve assembly, are located midway of the depression 13' which extends diametrically across the casting 10'.

The chamber A' includes a passage 27' extending centrally through the extension 25' and aligned with the nozzle or opening 14', and this passage is enlarged at its outer end to form a conical recess 28'. Oppositely extending aligned transverse recesses or passages 29 and 30 are formed in the extension 25', and communicate with the chamber A' through ports 31 and 32, respectively. The outer end of each recess 29 and 30 is threaded as at 33 and 34.

As illustrated, the valve assembly may be secured to a source of fluid under pressure by means of a connection 80 secured in the recess 30. This connection may comprise a flexible tubing 81 having at one end a flange 82 engaged by a compressible packing 83. A nut 84 surrounding the tubing 81 may be threaded into the recess 30, urging flange 82 into engagement with the bottom of the recess and compressing the packing to provide a fluid-tight connection. The opposite end of the tubing may be soldered or otherwise secured to a tail-piece 85 provided with a nut 86 for attachment to a gas cylinder or other source of fluid under pressure. The opposite recess 29 may be closed by compressible packing 87 held in place by a threaded plug 88.

A check valve 89 may be provided in tailpiece 85 to prevent reverse flow of fluid and dispense with the need for a special manifold valve for this purpose, and suitable filter material 90' may be provided in chamber A' and in tailpiece 85.

It will be obvious that a connection 80 may be secured in either one or both of the recesses 29 and 30, as desired. If one of the recesses is not used, it may be plugged, as shown in Fig. 6. Furthermore, by removing a cap 91 secured on the reduced and threaded portion 26' of the extension 25' and plugging both recesses 29 and 30, the valve assembly of Figs. 6 and 7 may be secured to the outlet of a change-over valve of the type described and claimed in the Carnes patent, supra. The several inlet connections permit ready adaptability of this valve assembly to use in many applications. As the construction and operation of this valve assembly are otherwise substantially the same as that illustrated in Figs. 1–5, further description is believed unnecessary.

While specific embodiments of the invention have been shown and described, it will be obvious that the invention may be otherwise embodied and the dimensions and interrelation of parts changed within the scope of the appended claims.

I claim:

1. A valve assembly comprising, in combination, a casting formed with an inlet chamber and an outlet chamber communicating with said inlet chamber, said outlet chamber being formed with a trough-like depression in one wall thereof, an opening in its opposite wall, and an opening in the bottom of said depression; means sealing said opening in said opposite wall; a pressure responsive diaphragm sealing said bottom opening; oppositely disposed outlet openings communicating with said depression; and a member bridging said depression adjacent said bottom opening and formed with an outlet passage normally sealed by said diaphragm.

2. A valve assembly as claimed in claim 1, in which said inlet chamber is formed with a central passage adapted to be secured to a valve mechanism and with transverse recesses intersecting said passage and each adapted to have secured therein an inlet connection.

3. A valve assembly as claimed in claim 1, in which said casting includes a protuberance formed with a threaded opening to receive mounting means for said casting.

4. An article of manufacture comprising a substantially circular integral member having a substantially circular wall bounded by an annular wall, said substantially circular wall being formed with a trough-like depression extending from said annular wall to the center of said substantially circular wall, and with an opening formed partly in said depression adjacent the outer end thereof and partly in said annular wall, said annular wall being formed with an integral radial extension adjacent the opening in said depression, and said extension and annular wall being formed with a passage extending axially through said extension, said extension also being formed with a pair of transversely extending passages intersecting said axially extending passage, and the inner end of said depression being formed with a transversely extending recess terminating at each end in aligned bosses drilled and threaded to form passages communicating with said recess.

HERMAN W. CARNES.